Patented June 10, 1930

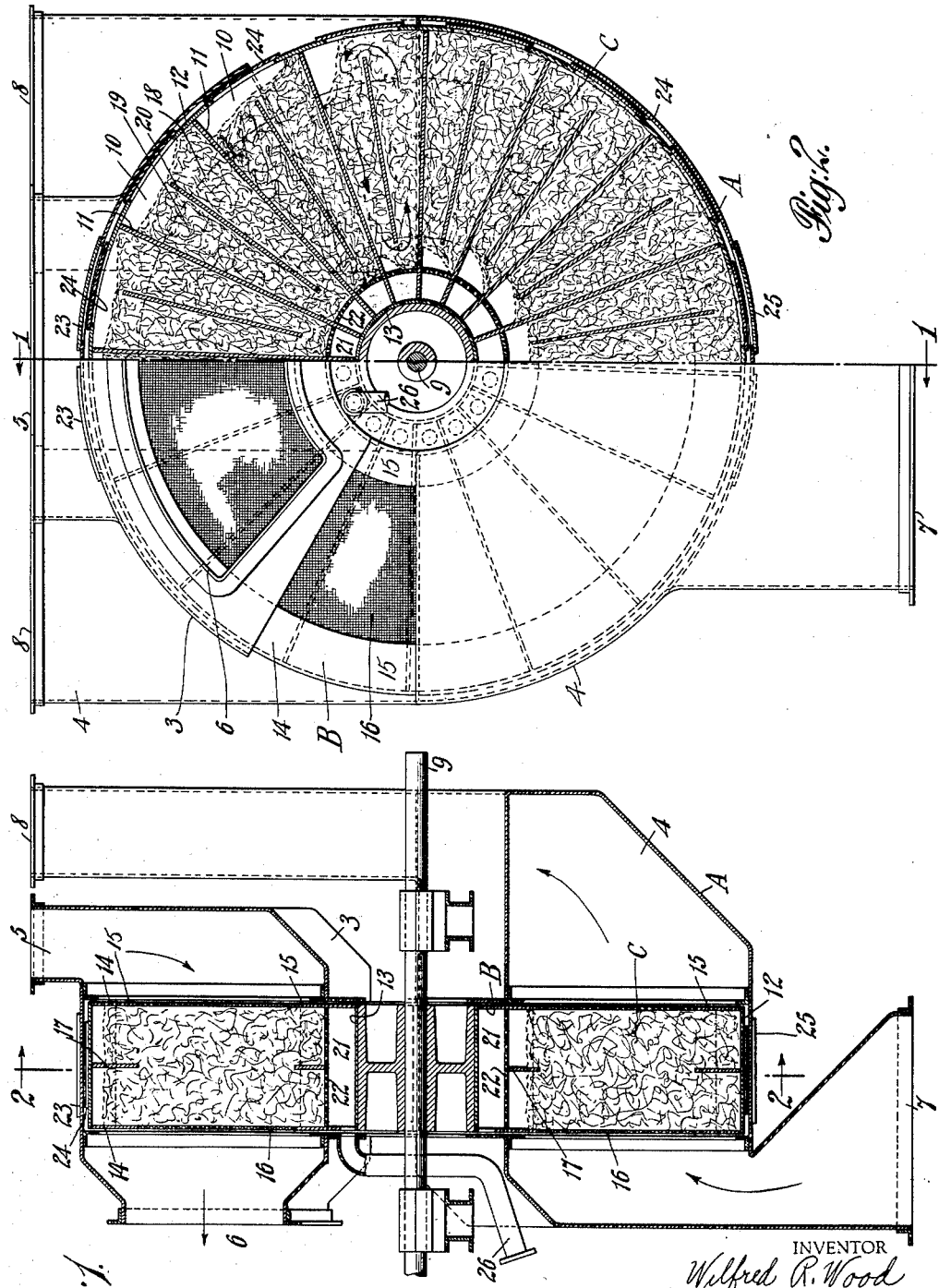

1,762,320

UNITED STATES PATENT OFFICE

WILFRED R. WOOD, OF LONDON, ENGLAND, ASSIGNOR TO INTERNATIONAL COMBUSTION ENGINEERING CORPORATION, OF NEW YORK, N. Y., A CORPORATION OF DELAWARE

ROTARY AIR HEATER

Application filed September 17, 1927. Serial No. 220,279.

This invention relates to rotary air heaters of the regenerative type, i. e., heaters in which the air is heated by passing it over heating material which had previously been heated by passing a heating medium thereover, such as flue gas.

I am aware that heaters employing this principle have heretofore been proposed, but such heaters are open to certain objections which I aim to overcome. Among the objections are the accumulation of dust in the heater, the cost of manufacture, and the cost of repairs.

It is an object of my invention to provide a heater which is inexpensive to manufacture, easy to repair and one in which dust accumulation is effectively prevented.

A more specific object is the provision in a heater of the above character of an arrangement whereby scrap material, such as lathe cuttings, scrap ends of drawn ferrules, or coils of wire may be effectively used as regenerative material.

Another object is the provision of means for freeing the regenerative material of dust and to provide for the removal of such dust from the heater.

A further object of my invention is the provision of a heater of the rotary type in which the rotation of the rotor causes movement of the regenerative material in a manner to prevent dust accumulation.

How the foregoing, together with such other objects and advantages as may hereinafter appear, or are incident to my invention, are realized, is illustrated in preferred form in the accompanying drawings, wherein—

Fig. 1 is a cross section through a heater constructed in accordance with my invention, the section being taken substantially on the line 1—1 of Fig. 2, and Fig. 2 is in part a face view of Fig. 1 looking toward the right and in part a section taken substantially on the line 2—2 of Fig. 1.

The air heater illustrated comprises in general a casing structure A, a rotor B and regenerative material C.

In this instance the casing structure A consists of two casings 3 and 4, the casing 3 being an air casing having an air inlet 5 and an air outlet 6, and the casing 4 being a gas casing having a gas inlet 7 and gas outlets 8.

The rotor B is mounted on the shaft 9 in any convenient manner, which shaft may be rotated by suitable mechanism. The rotor is divided into a plurality of compartments 10, preferably sector-shaped, by means of the partitions 11 extending from the outer peripheral wall 12 of the rotor to the inner peripheral wall 13 thereof. The side walls 14 of the rotor are partly solid and partly foraminous as indicated by the numerals 15 and 16, respectively, and these side walls constitute the end walls of the sector-shaped compartments 10. Baffles 17 located intermediate the end walls may be provided in the compartments as illustrated in Fig. 1. Each of the compartments 10 is subdivided into two juxtaposed communicating chambers 18 and 19 by means of the plates 20, which plates end short of both the outer wall 12 and the inner wall 13 of the rotor. Collecting chambers 21, for a purpose hereinafter appearing, are provided at the inner periphery of the rotor by means of the foraminous partitions 22.

Each of the compartments 10 is supplied with loose regenerative material, preferably lathe cuttings. The material may be inserted through the doors 23 in the casing 3 with which the doors 24 of each compartment may be brought into registry upon rotating the rotor. The material may be removed by similar doors 25 in the casing 4. It is pointed out that the amount of material in each compartment is of a volume somewhat short of the volumetric capacity of the compartments.

The operation of the heater is as follows. Hot flue gas, preferably under pressure, enters the casing 4 at 7 and passes over the regenerating material in the compartments which are in registry with this gas casing and then leaves the casing through the outlets 8. As the rotor B rotates the compartments carrying the regenerative material just heated are brought into registry with the air casing 3. The air, preferably under pressure, enters this casing at 5, passes over the regenerative material abstracting heat therefrom and becoming heated, and leaves the casing through the outlet 6 which may be provided with any suitable form of connection for leading it to the desired point, as, for example, to the combustion chamber of a furnace.

As the gas employed for heating contains a considerable amount of dust, it will be seen that without provision to the contrary, the heater would soon become clogged with dust and its effectiveness would be destroyed. I effectively free the regenerative material of dust and discharge the dust from the heater by providing the collecting chambers 21 at the inner periphery of the heater and by providing the plates 20 which ensure movement of the regenerative material relative to the rotation of the rotor, the action being as follows. As the rotor rotates the regenerative material traverses the compartments so that bodily movement of translation is imparted to the material which frees the material of dust. The dust works round until it gets to the small end of the sector and passes through the foraminous partition 22 into the collecting chambers. The dust may be withdawn from these chambers by any suitable exhausting device to which the chambers may be connected as by means of a pipe or pipes 26. If desired a dust collecting chamber common to all of the compartments 10 may be provided.

The above action may be stated in another way as follows:

As the rotor revolves, the material in the sectors, which sectors have not been entirely filled, is caused by the division plate 20 to travel constantly in one direction, radially outwardly, then around the end of the plate, then inwardly to the center and then round the inner end of the plate and so on. At each revolution, the material shifts and rattles round the ends of the plate, so that the particles of heating material are constantly travelling and being rattled, whereby they free themselves of dust, which dust works to the center and is withdrawn as above mentioned.

It is pointed out that the amount of material in the compartments and the extent of the solid portions 15 of the end walls of the compartments is such that at no time will there be free passages through which air or gas can short circuit to destroy the effectiveness of the heater. The baffles 17 aid to further ensure against such short circuiting.

From the foregoing it will be seen that I have provided an air heater which is inexpensive to manufacture, the regenerative material being cheap scrap which eliminates machine work, fitting and etc.; one which is easy to repair; one which automatically frees the regenerative material of dust and automatically removes the dust; and one in which a very large amount of heating surface is exposed per weight or cubic foot of heating material. A very high heat transfer is afforded in a heater of the character described for the reason that the waste material employed as a heating surface results in thoroughly breaking up and eddying the stream of air and alternating gas.

I claim:—

1. An air heater comprising in combination, a casing structure having air and gas inlets and outlets, a rotor divided into a plurality of compartments sub-divided for a portion of their extent, heat absorbing material in said compartments of a volume short of the volumetric capacity of the compartments adapted to traverse the subdivisions of the compartments, said material in its traverse being self freeing of foreign matter, and an outlet for said matter.

2. An air heater comprising, in combination, a casing structure having gas and air inlets and outlets, a rotor divided into a plurality of sector-like compartments each of which is sub-divided for a portion of its extent, foraminous end walls for said compartments, heat absorbing material in said compartments of a volume short of the volumetric capacity of the compartments, the gas and air in their passage from their respective inlets to outlets giving off and abstracting heat respectively to and from the heating material, said heating material being adapted to traverse the aforesaid subdivisions as the rotor rotates whereby dust entering with the gas is freed from the heating material, and an outlet for the dust.

3. A rotary air heater of the regenerative type comprising, in combination, a rotor divided into a plurality of sector-shaped regenerative material receiving compartments, means for sub-dividing said compartments for a portion of their extent, foraminous means constituting the bottoms of said compartments, foraminous means constituting the ends of said compartments, means for passing flue gas through said compartments, means for passing air through said compartments, regenerative material in said compartments adapted to move relatively to the movement of the rotor, and means for withdrawing dust from said compartments.

4. A rotary air heater of the regenerative type comprising, in combination, a rotor divided into a plurality of sector-shaped compartments, loose regenerative material in said compartments, means in said compartments for causing said material to traverse the compartments as the rotor rotates, means for passing a heating medium amongst the particles of material, and means for passing air amongst the particles of material, said air being heated by heat previously absorbed by the regenerative material.

5. A rotary air heater of the regenerative type comprising, in combination, a casing structure having air and gas inlets and outlets, a rotor, means dividing said rotor into a plurality of compartments, means dividing each compartment into two juxtaposed communicating chambers, foraminous means providing a collecting chamber in each of said compartments, foraminous means constituting the end walls of said chambers, loose regenerative material in said chambers adapted to traverse the aforesaid communicating chambers as the rotor rotates, and means for discharging substances entering the collecting chambers.

6. In a heater of the regenerative type, the combination with a casing structure having air and gas inlets and outlets, of a member provided with a plurality of compartments, said member being movable to bring such compartments successively into communication with the air and gas passages of the casing structure, and relatively small loose regenerative elements in said compartments, each compartment containing insufficient elements to fill it so that the elements will have bodily movement of translation in said compartments imparted thereto when said member is moved.

In testimony whereof I have hereunto signed my name.

WILFRED R. WOOD.